Patented May 26, 1931

1,806,798

UNITED STATES PATENT OFFICE

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

PROCESS FOR MAKING PHENOLIC COMPOUNDS

No Drawing.   Application filed August 6, 1928.   Serial No. 297,914.

It is well known that the action of water upon organic halides, and other organic derivatives of inorganic acids capable of hydrolysis, leads not alone to the formation of primary substituted derivatives of the water type, known as hydroxides, alcohols, or phenols, but also to the formation of secondary substituted derivatives of the water type, known as oxides or ethers. Between such two compounds in any particular reaction of the type in question there is a tendency towards a condition of equilibrium which may by represented by the following equation wherein R represents a univalent hydrocarbon radical:

$$2ROH \rightleftharpoons R_2O + H_2O$$

It will be understood, of course, that when both liquid and gaseous phases are present, the equilibria in both states must come into consideration; also at higher temperatures, and especially in the presence of metallic oxides, the tendency to dehydration is the more favored; while the degree of concentration of any one of the components naturally becomes a determinate factor at any given temperature and pressure.

In general the aryl derivatives of inorganic acids are more difficult to hydrolyze than alkyl derivatives of the same acids. When chlorobenzene is heated with water at about 300° C., little or no hydrolysis is detected, but at higher temperatures this hydrolysis may be made appreciable. The degree of dehydration of the phenol produced, resulting in the formation of diphenyl oxide, is likewise increased with a rise in temperature. According to U. S. Patent No. 1,607,618, to Hale and Britton, the hydrolysis of chlorobenzene in presence of an appreciable concentration of hydroxide-ion is practically complete within an hour when conducted at temperatures of 340 to 380° C. and under a pressure of 3500 to 4000 pounds per square inch. The invention described in the above patent covers the introduction into the original reaction mixture of approximately the same proportional quantity of diphenyl oxide that is capable of production in the system during the operation and in keeping with the state of equilibrium described above.

In a circulatory tubular system, wherein the liquid phase predominates, such diphenyl oxide concentration, even at 370° C., rarely exceeds 10 to 12 percent of the chlorobenzene used. The presence, therefore, of this proportional quantity of diphenyl oxide together with 90 to 88 percent of chlorobenzene, respectively, as basis for 100 percent of the original organic ingredient serves to maintain the diphenyl oxide at its maximum concentration throughout the entire reaction zone and makes impossible any further building up in concentration of such diphenyl oxide beyond that point indicated in the equilibrium existent under the conditions of operation. All of the chlorobenzene, therefore, brought into this hydrolytic operation will be found to be completely hydrolyzed into phenol alone.

We have now discovered that the control of other hydrolytic operations involving various cyclo-organic derivatives of inorganic acids can be directed in conformity with the invention above cited; also that such method of control is effective under other conditions than found present in a closed system such as involved in the foregoing patent. In all cases, however, the new and improved procedure is concerned directly with the equilibrium arising in any reaction system between a primary and a secondary substituted cyclic organic derivative of water and it comprehends that range of temperature in which the equilibrium attains such proportions as to make commercially applicable the control of its direction to the side of the primary substituted compound. In no instance examined in a closed system has it been neces sary to go beyond the upper limit of about 400° C. and a corresponding pressure in order to bring into play the hydration of whatever secondary substituted derivative of water was at hand.

Hydrolytic operations in open systems, i. e., at atmospheric pressure, offer greater possibilities for repressing the dehydration of the resulting hydroxyl derivatives to a minimum through the presence of an easily controllable increase in head of water vapor. In circumstances where hydrolytic operations demand higher and higher temperatures there exists a directly proportional increase in tendency toward dehydration of the hydroxyl derivatives into ethers. Accordingly, in applying our method of control to the open system, an important distinction has been noted, namely, that whereas in closed systems the proportional quantity of secondary substituted aryl or equivalent carbo-cyclic derivative of water is necessarily maintained at its maximum possible concentration under the conditions of the reaction throughout the entire reaction zone, in open systems it is only necessary to maintain that concentration of such derivatives as is defined by its proportional concentration in the vapor issuing at the end of the reaction zone. Whatever diminution or increase in the ether compound as may occur in the prior portion of the reaction zone does not affect the operation of this invention, which concerns the state of equilibrium only at the end of the reaction zone, or where removal of products is under way.

To the accomplishment of this and related ends the invention, then, consists of the steps hereinafter described and particularly pointed out in the claims, the following description setting forth but several of the various ways in which the invention may be carried out.

Referring by way of specific illustration to the hydrolysis of chlorobenzene by water in the presence of a catalyst, this reaction requires a temperature of approximately 450° C. with atmospheric pressure. The yield in phenol does not greatly exceed ten to fifteen per cent. The dehydration of the resulting phenol into diphenyl oxide is decidedly marked at such elevated temperature and may reach as much as fifty per cent according to Sabatier ("Catalysis in Organic Chemistry" 1st Eng. ed. 1923 par. 786), when thorium oxide is present. The reverse is likewise true, as concerns the hydration of diphenyl oxide, to as much as fifty per cent under these same conditions of temperature and atmospheric pressure. The great excess of water vapor present in this open system drives the concentration of diphenyl oxide to a minimum, usually from one to two per cent of the total phenol produced.

In practice it is advisable to operate in pyrex tubes, or in metal tubes specially protected against the corrosive action of hot dilute acid vapors. The tubular chamber is charged with pumice or other inert material upon which is deposited cuprous chloride or other catalytic agent for the reaction. Into the tubular chamber now heated to approximately 450° C. a mixture of chlorobenzene and an excess of water vapor is introduced; at the same time there is introduced a definite small amount of diphenyl oxide, corresponding with that proportional quantity of same that has been found capable of production from the original reacting ingredients under the conditions of operation; which diphenyl oxide itself has been conveniently secured for this purpose by recovery from the products of the reaction.

The diphenyl oxide may be introduced together with the chlorobenzene, or it may be introduced independently at some point prior to the end stage of reaction zone. In amount it is found usually less than three per cent of the phenol produced, and as the hydrolytic action above described and maintained in force for a few minutes only leads to about ten per cent conversion of the chlorobenzene into phenol, the relative proportion of diphenyl oxide to chlorobenzene entering the system will be approximately 1 to 500. The vapors issuing from the reaction tubes are led through condensers, whereupon the aqueous layer of the condensate, containing the phenol, is removed and submitted to steps for the separation and purification thereof. The chlorobenzene layer may be purified by distillation, or it may be returned to the system without purification; it carries for the most part the requisite proportional quantity of diphenyl oxide necessary for the proper control and direction of the hydrolytic operation at hand. A certain small portion of diphenyl oxide is likewise recoverable from the phenol fractions; this portion should be added to the diphenyl oxide to be returned to the reaction zone.

The hydrolysis of substituted cyclo-organic derivatives of inorganic acids will be subject to the same general principle as above outline. The substituent groups, however, must be non-removable by the agency of the hydrolytic agent, as otherwise a twofold ether formation would ensue, and the subsequent hydration would not reproduce the same intermediate hydroxyl derivative as first produced.

The chlorotoluenes, for example, are illustrative of that class of substituted derivatives of inorganic acids which will admit of exactly similar control as hereinbefore described in their hydrolysis into the corresponding cresols. The ditolyl oxides, arising by dehydration of the cresols, must be reintroduced into the original reaction mixture in order to effect complete hydrolysis of the chlorotoluenes, respectively, into the corresponding cresols.

In the case of mixtures of ortho-, meta- and para-chlorotoluenes undergoing hydrolysis in the same vessel, this invention is likewise applicable. The various ethers possible of production between the dissimilar cresols must be introduced into the reaction system in approximately those proportional quantities in which they are found to be capable of production under the equilibria, existent in the system, when the presence of each individual ether will be found to serve as a repressant against further increase in concentration thereof at the expense of cresols involved. The result will be registered by direction of the hydrolysis of the three chlorotoluenes entirely into the corresponding cresols.

The present invention, therefore, is applicable primarily to the control of hydrolytic operations in open systems involving the production of monohydric alcohols or phenols and is concerned with the control of the production thereof by the introduction into the reaction system of whatever oxides or ethers of such monohydric alcohols or phenols as are capable of formation under the conditions of the reaction. Likewise, mixtures of such oxides or ethers which are found to exist in any system of like nature, may also be employed in the application of this invention, for the direction of hydrolyses entirely to the production of monohydric alcohols or phenols.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a process for the manufacture of phenolic compounds by the direct hydrolytic action of water in the vapor phase upon a nuclear halogenated aromatic hydrocarbon in the presence of a catalyst, the step which consists in adding the corresponding diaryl oxide to the reacting ingredients.

2. In a process for the manufacture of phenolic compounds by the direct hydrolytic action of water in the vapor phase upon a nuclear halogenated aromatic hydrocarbon in the presence of a catalyst, the step which consists in adding the corresponding diaryl oxide to the reacting ingredients in amount sufficient to maintain the system in an approximate state of chemical balance with respect to such oxide.

3. In a process for the manufacture of phenolic compounds by the direct hydrolytic action of water in the vapor phase upon a nuclear halogenated aromatic hydrocarbon in the presence of a catalyst, the steps which consist in condensing and separating the diaryl oxide and phenolic compounds, and returning such oxide to the reacting ingredients.

4. In a process for the manufacture of phenolic compounds by the direct hydrolytic action of water in the vapor phase upon a nuclear halogenated aromatic hydrocarbon in the presence of a catalyst, the steps which consist in condensing and separating the diaryl oxide and phenolic compound, and returning such oxide, along with unreacted hydrocarbon derivative, to the reacting ingredients.

5. In a process for the manufacture of phenolic compounds by the direct hydrolytic action of water in the vapor phase upon a mono-halogenated benzene in the presence of a catalyst, the step which consists in adding diphenyl oxide to the reacting ingredients.

6. In a proccess for the manufacture of phenolic compounds by the direct hydrolytic action of water in the vapor phase upon a mono-halogenated benzene in the presence of a catalyst, the step which consists in adding diphenyl oxide to the reacting ingredients in amount sufficient to maintain the system in an approximate state of chemical balance with respect to such oxide.

7. In a process for the manufacture of phenolic compounds by the direct hydrolytic action of water in the vapor phase upon a mono-halogenated benzene in the presence of a catalyst, the steps which consist in condensing and separating the resulting diphenyl oxide and phenolic compound, and returning such oxide to the reacting ingredients.

8. In a process for the manufacture of phenolic compounds by the direct hydrolytic action of water in the vapor phase upon a mono-halogenated benzene in the presence of a catalyst, the steps which consists in condensing and separating the resulting diphenyl oxide and phenolic compound, and returning such oxide, along with unreacted hydrocarbon derivative, to the reacting ingredients.

9. A process for the manufacture of phenol, comprising hydrolyzing chloro-benzene by the action of water in vapor phase and in the presence of a catalyst, and adding diphenyl oxide to the reacting ingredients.

10. A process for the manufacture of phenol, comprising hydrolyzing chloro-benzene by the action of water in vapor phase and in the presence of a catalyst, and adding diphenyl oxide to the reacting ingredients in amount sufficient to maintain the system in an approximate state of chemical balance with respect to such oxide.

11. A process for the manufacture of phenol, comprising hydrolyzing chloro-benzene by the action of water in the vapor phase and in the presence of a catalyst, condensing and separating the resulting diphenyl oxide and phenol, and returning such oxide to the first step.

12. A process for the manufacture of phenol, comprising hydrolyzing chloro-benzene by the action of water in the vapor phase and in the presence of a catalyst, condensing and separating the resulting diphenyl oxide and phenol, and returning such oxide along with unreacted chloro-benzene to the first step.

Signed this 2nd day of August, 1928.

WILLIAM J. HALE.
EDGAR C. BRITTON.